US012652668B2

(12) United States Patent
Lu et al.

(10) Patent No.: US 12,652,668 B2
(45) Date of Patent: Jun. 9, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Qianxi Lu, Dongguan (CN); Zhenshan Zhao, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 540 days.

(21) Appl. No.: 17/650,200

(22) Filed: Feb. 7, 2022

(65) Prior Publication Data

US 2022/0159696 A1     May 19, 2022

Related U.S. Application Data

(63) Continuation of application No. PCT/CN2019/100265, filed on Aug. 12, 2019.

(51) Int. Cl.
*H04W 76/14* (2018.01)
*H04W 4/40* (2018.01)
(Continued)

(52) U.S. Cl.
CPC .............. *H04W 72/20* (2023.01); *H04W 4/46* (2018.02); *H04W 72/23* (2023.01); *H04W 76/14* (2018.02);
(Continued)

(58) Field of Classification Search
CPC ..... H04W 72/20; H04W 72/23; H04W 92/18; H04W 72/543; H04W 4/70; H04W 8/24;
(Continued)

(56) References Cited

U.S. PATENT DOCUMENTS

| | | | |
|---|---|---|---|
| 2016/0344782 A1 | 11/2016 | Cheng et al. | |
| 2019/0215685 A1 | 7/2019 | Wang et al. | |

(Continued)

FOREIGN PATENT DOCUMENTS

| | | | |
|---|---|---|---|
| CN | 106162734 A | 11/2016 | |
| CN | 108781441 A | 11/2018 | |

(Continued)

OTHER PUBLICATIONS

3GPP TS 23.287 V1.1.0, Jul. 2019 (Year: 2019).*

(Continued)

*Primary Examiner* — Faruk Hamza
*Assistant Examiner* — Aixa A Guadalupe Cruz
(74) *Attorney, Agent, or Firm* — PERKINS COIE LLP

(57)                ABSTRACT
Provided are a wireless communication method, a terminal device, and a network device. The method includes: sending reporting information to the network device on the basis of an information type of information to be transmitted for establishing a unicast service sidelink. According to the technical solution, the terminal device can send the reporting information to the network device on the basis of the information type of the information to be transmitted for establishing the unicast service sidelink; the technical solution is applicable to a unicast service in an NR V2X system, and solves the problem of how to report information for different PC5-S/-RRC messages during service reporting.

17 Claims, 4 Drawing Sheets

(51) Int. Cl.

| | |
|---|---|
| *H04W 4/46* | (2018.01) |
| *H04W 8/00* | (2009.01) |
| *H04W 72/20* | (2023.01) |
| *H04W 72/23* | (2023.01) |
| *H04W 28/24* | (2009.01) |
| *H04W 92/18* | (2009.01) |

(52) U.S. Cl.
CPC ............ *H04W 8/005* (2013.01); *H04W 28/24* (2013.01); *H04W 92/18* (2013.01)

(58) Field of Classification Search
CPC ....... H04W 72/25; H04W 76/40; H04W 8/26; H04W 28/24; H04W 76/14; H04W 4/40; H04W 4/20
See application file for complete search history.

(56) References Cited

U.S. PATENT DOCUMENTS

| | | | | |
|---|---|---|---|---|
| 2020/0229262 | A1* | 7/2020 | Jung | H04W 76/27 |
| 2021/0410129 | A1* | 12/2021 | Freda | H04W 72/20 |
| 2022/0117017 | A1* | 4/2022 | Lee | H04W 76/15 |
| 2022/0217575 | A1* | 7/2022 | Wang | H04W 28/0268 |
| 2022/0286896 | A1* | 9/2022 | Wang | H04W 76/23 |

FOREIGN PATENT DOCUMENTS

| | | | |
|---|---|---|---|
| EP | 3416436 | A1 | 12/2018 |
| WO | 2017171251 | A1 | 10/2017 |

OTHER PUBLICATIONS

3GPP TR 38.885 V2.0.0 (Mar. 2019)—3rd Generation Partnership Project; Technical Specification Group Radio Access Network; NR, Study on Vehicle-to-Everything (Release 16) (122 pages).
European Search Report dated Jun. 15, 2022 of European Patent Application No. 19941613.2 (6 pages).
3GPP TSG-RAN WG2 Meeting #105bis draft021_R2-1905329 LG Electronics Inc.,[Draft] LS on protection of PC5-RRC messages for sidelink unicast, 2 pages.
3GPP TSG-RAN WG2 #105bis R2-1904717 Ericsson, On PC5-RRC for unicast NR V2X, 3 pages.
Notice of Allowance for CN Application No. 202210109515.X Issued Sep. 21, 2023. 7 pages with English translation.
3GPP TSG-RAN WG2 Meeting #105bis—R2-1903211—Xi'an, China, Apr. 8-Apr. 12, 2019—OPPO, Discussion on PC5-RRC for unicast (9 pages).
3GPP TSG-RAN WG2 Meeting #105bis—R2-1904721—Xi'an, China, Apr. 8-12, 2019—Qualcomm Incorporated, Discussion on PC5-RRC and PC5-S (5 pages).
International Search Report issued Apr. 26, 2020 of PCT/CN2019/100265 (5 pages).
3GPP TSG RAN Meeting #80—RP-181429—La Jolla, USA, Jun. 11-14, 2018—Vodafone, New SID: Study on NR V2X (5 pages).
Second Office Action of the CN application No. 202210109515.X, issued on Jun. 14, 2023. 11 pages with English translation.
European Examination Report dated Mar. 6, 2023 of European Patent Application No. 19 941 613.2-1218 (5 pages).
First Office Action with English translation dated Mar. 15, 2023 of Chinese Patent Application No. 202210109515.X (12 pages).

* cited by examiner

WIRELESS COMMUNICATION METHOD, TERMINAL DEVICE, AND NETWORK DEVICE

CROSS-REFERENCE TO RELATED APPLICATION

The present application is a continuation application of International PCT Application No. PCT/CN2019/100265, filed on Aug. 12, 2019, the entire content of which is hereby incorporated by reference.

TECHNICAL FIELD

Implementations of the present disclosure relate to the field of communications, and more specifically, to a wireless communication method, a terminal device and a network device.

BACKGROUND

In LTE, the process of service reporting is relatively simple. Specifically, a terminal device reports a service before initiating the service. For example, the terminal device has all the information needed for reporting, e.g., including a target address and associated QoS attribute information. The reporting only needs to be performed for a single target address. After receiving service reporting information, a network device provides corresponding access layer configuration information through an RRC reconfiguration message to acquire the resources needed for sidelink communication, so as to perform sidelink communication.

NR V2X is an extension based on LTE V2X.

NR V2X may be applied to unicast and multicast scenarios, that is, the application of V2X may be studied in these scenarios. Therefore, the solution of sidelink reporting in LTE is not suitable for the scenario of sidelink reporting in NR, and a solution of sidelink reporting in NR is urgently needed in this field.

However, there is no clear solution for the service reporting process in NR V2X.

SUMMARY

A wireless communication method, a terminal device and a network device are provided, which can improve the service reporting mechanism in NR V2X.

In a first aspect, a wireless communication method is provided, including:

sending reporting information to a network device based on an information type of information to be transmitted for establishing a unicast service sidelink.

In a second aspect, a wireless communication method is provided, including:

receiving reporting information sent by a terminal device based on an information type of information to be transmitted for establishing a unicast service sidelink.

In a third aspect, a wireless communication method is provided, including:

sending indication information to a network device, the indication information being used for indicating the network device to send access layer configuration information and/or sidelink grant information of information to be transmitted, the information to be transmitted being information for establishing a unicast service sidelink.

In a fourth aspect, a wireless communication method is provided, including:

receiving indication information sent by a terminal device, the indication information being used for indicating the network device to send access layer configuration information and/or sidelink grant information of information to be transmitted, the information to be transmitted being information for establishing a unicast service sidelink.

In a fifth aspect, a wireless communication method is provided, including:

acquiring pre-configured access layer configuration information and/or sidelink grant information of information to be transmitted, the information to be transmitted being information for establishing a unicast service sidelink.

In a sixth aspect, a wireless communication method is provided, including:

sending reporting information of information to be transmitted to a network device, the information to be transmitted being used for a multicast service sidelink.

In a seventh aspect, a wireless communication method is provided, including:

receiving reporting information of information to be transmitted sent by a terminal device, the information to be transmitted being used for a multicast service sidelink.

In an eighth aspect, a terminal device is provided, which is configured to perform the method in the first aspect or each implementation mode thereof, and/or the method in the third aspect or each implementation mode thereof, and/or the method in the fifth aspect or each implementation mode thereof, and/or the method in the sixth aspect or each implementation mode thereof. Specifically, the terminal device includes a functional module for performing the method in the first aspect or each implementation mode thereof, and/or the method in the third aspect or each implementation mode thereof, and/or the method in the fifth aspect or each implementation mode thereof, and/or the method in the sixth aspect or each implementation mode thereof.

In a ninth aspect, a network device is provided, which is configured to perform the method in the second aspect or each implementation mode thereof, and/or the method in the fourth aspect or each implementation mode thereof, and/or the method in the seventh aspect or each implementation mode thereof. Specifically, the network device includes a functional module for performing the method in the second aspect or each implementation mode thereof, and/or the method in the fourth aspect or each implementation mode thereof, and/or the method in the seventh aspect or each implementation mode thereof.

In a tenth aspect, a terminal device is provided, including a processor, a memory and a transceiver. The memory is configured to store a computer program, and the processor is configured to call and run the computer program stored in the memory to perform, through the transceiver, the method in the first aspect or each implementation mode thereof, and/or the method in the third aspect or each implementation mode thereof, and/or the method in the fifth aspect or each implementation mode thereof, and/or the method in the sixth aspect or each implementation mode thereof.

In an eleventh aspect, a network device is provided, including a processor, a memory, and a transceiver. The memory is configured to store a computer program, and the processor is configured to call and run the computer program stored in the memory to perform, through the transceiver, the method in the second aspect or each implementation mode thereof, and/or the method in the fourth aspect or each implementation mode thereof, and/or the method in the seventh aspect or each implementation mode thereof.

In a twelfth aspect, a chip is provided, which is used for implementing the method in any one of the first to seventh aspects or each implementation mode thereof. Specifically, the chip includes: a processor configured to call and run a computer program from a memory, to cause a device installed with the chip to perform the method in any one of the first to seventh aspects or each implementation mode thereof.

In a thirteenth aspect, a computer-readable storage medium is provided, which is used for storing a computer program that causes a computer to perform the method in any one of the first to seventh aspects or each implementation mode thereof.

In a fourteenth aspect, a computer program product is provided, including computer program instructions that cause a computer to perform the method in any one of the first to seventh aspects or each implementation mode thereof.

In a fifteenth aspect, a computer program is provided, which, when run on a computer, causes the computer to perform the method in any one of the first to seventh aspects or each implementation mode thereof.

According to the above technical solutions, the terminal device can send reporting information to the network device based on the information type of the information to be transmitted for establishing a unicast service sidelink; and the technical solutions are applicable to a unicast service in an NR V2X system, to solve the problem of how to report information for different PC5-S/-RRC messages during service reporting.

DETAILED DESCRIPTION

Hereinafter, technical solutions in the implementations of the present disclosure will be described with reference to the accompanying drawings.

The implementations of the present disclosure may be applied to any communication architecture of terminal device to terminal device. For example, Vehicle to Vehicle (V2V), Vehicle to Everything (V2X), Device to Device (D2D), etc.

The terminal in the implementations of the present disclosure may be any device or apparatus configured with a physical layer and a media access control layer, and the terminal device may also be called an access terminal, for example, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a radio communication function, a computing device, or other linear processing devices connected to a wireless modem, a vehicle-mounted device, a wearable device, or the like. In the implementations of the present disclosure, description is made by taking a vehicle-mounted terminal as an example, but the implementations of the present disclosure are not limited thereto.

Optionally, in some implementations of the present disclosure, the implementations of the present disclosure may be applied to transmission mode 3 and transmission mode 4 defined in Rel-14 of the 3rd Generation Partnership Project (3GPP).

Figures 1, 2:
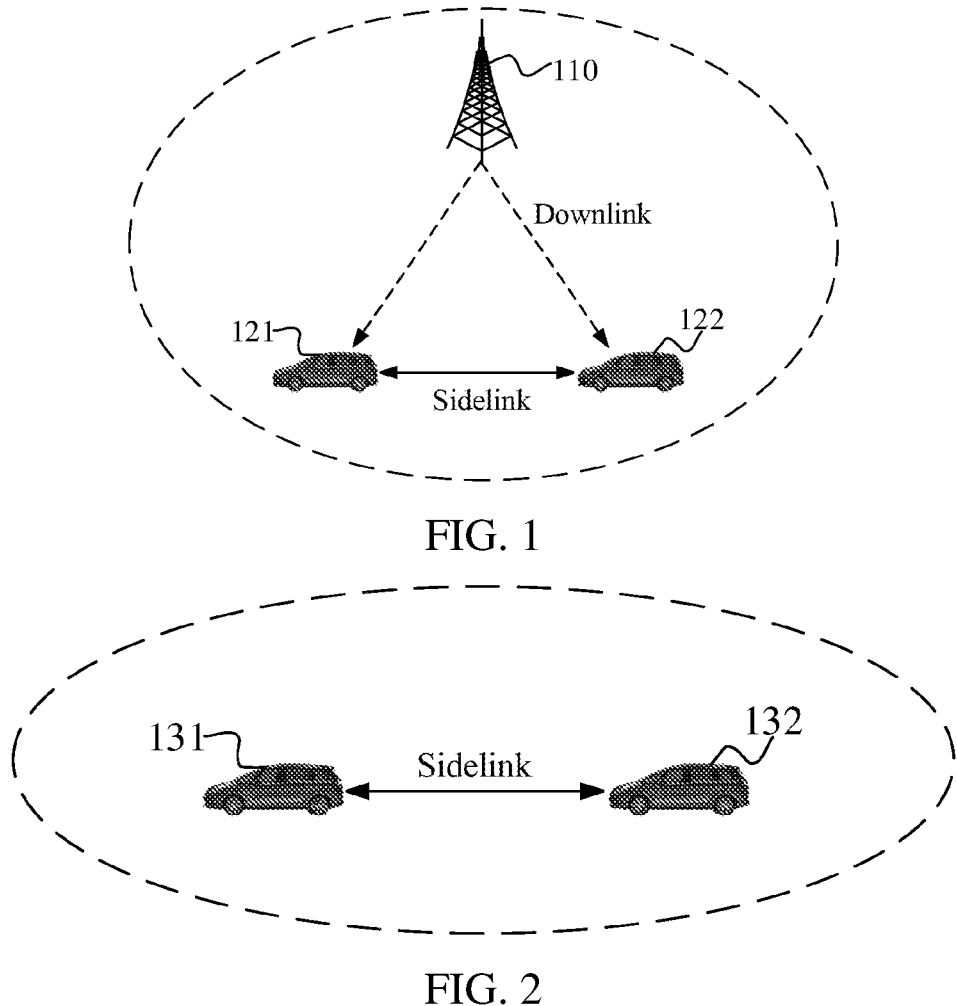
FIG. 1 is a schematic frame diagram of a transmission mode according to an implementation of the present disclosure.
FIG. 2 is a schematic frame diagram of another transmission mode according to an implementation of the present disclosure.

FIG. 1 is a schematic diagram of mode 3 according to an implementation of the present disclosure. FIG. 2 is a schematic diagram of mode 4 according to an implementation of the present disclosure.

In the transmission mode 3 shown in FIG. 1, transmission resources of vehicle-mounted terminals (vehicle-mounted terminal 121 and vehicle-mounted terminal 122) are allocated by a base station 110, and the vehicle-mounted terminals send data on a sidelink according to the resources allocated by the base station 110. Specifically, the base station 110 may allocate resources for single transmission to the terminal, and may also allocate resources for semi-statical transmission to the terminal.

In the transmission mode 4 shown in FIG. 2, vehicle-mounted terminals (vehicle-mounted terminal 131 and vehicle-mounted terminal 132) adopt a transmission mode of sensing and reservation, and the vehicle-mounted terminals select transmission resources from the resources of the sidelink for data transmission independently.

Next, detailed description will be made by taking the vehicle-mounted terminal 131 as an example.

The vehicle-mounted terminal 131 acquires a set of available transmission resources from a resource pool by sensing, and the vehicle-mounted terminal 131 randomly selects a transmission resource from the set for data transmission.

Since services in the Vehicle to Everything system have periodic characteristics, in the implementations of the present disclosure, the vehicle-mounted terminal 131 may also adopt a semi-statical transmission mode. That is, after acquiring a transmission resource, the vehicle-mounted terminal 131 uses the transmission resource persistently in multiple transmission periods to reduce the probabilities of resource re-selection and resource conflict.

The vehicle-mounted terminal 131 may carry information of a resource reserved for a next transmission in control information of a current transmission, so that other terminals (e.g., the vehicle-mounted terminal 132) may determine whether the resource is reserved and used by a user by detecting control information of the user, thus reducing resource conflicts.

It should be noted that the vehicle-mounted terminals involved in the implementations of the present disclosure may be applied to the scenarios with relatively high data interaction efficiency, such as automatic driving.

In 3GPP, D2D is studied in different stages.

For example, in Rel-12/13, the scenario of Proximity based Service (ProSe) is studied, which is mainly directed to public security services. In Rel-14/15, the scenario of Vehicle to Vehicle (V2V) in the Vehicle to Everything (V2X) system is mainly studied, which is mainly oriented to the relatively high-speed moving vehicle-to-vehicle and vehicle-to-person communication services. In Rel-14, in this scenario, the scenario of a wearable device (FeD2D) accessing a network through a mobile phone is studied, which is mainly oriented to the scenarios of low moving speed and low power access.

NR V2X is an extension based on LTE V2X.

NR V2X may be applied to scenarios of unicast and multicast, that is, the application of V2X may be studied in these scenarios. Similar to LTE V2X, NR V2X may also define the above two resource grant modes: mode-A/B. Furthermore, a user may be in a mixed mode, i.e., the user may use both mode-A and mode-B to acquire resources. Unlike LTE V2X, in addition to feedback-free HARQ retransmission initiated by a terminal device autonomously, NR V2X introduces feedback-based HARQ retransmission, which is not limited to unicast communication, but also includes multicast communication.

In LTE, the service reporting process of the sidelink is relatively simple.

For example, a terminal device performs reporting before initiating a service, and the terminal device has all the information needed for reporting, including a target address and associated QoS attribute information. The reporting only needs to be performed for a single target address. After receiving service reporting information, a network device may provide corresponding access layer configuration information through an RRC reconfiguration message to acquire the resources needed for sidelink communication, so as to perform sidelink communication. The access layer configuration information may include resource information, for example, the UE uses SR/BSR (mode-A) or uses a resource pool (mode-B).

For example, in ProSe and V2X, the terminal device may use SidelinkUEInformation for service reporting, the information includes the following information: frequency point information needed by UE for sidelink communication; layer 2 target address information needed by UE for sidelink communication; transmission mode information needed by UE for sidelink communication, e.g., broadcast/multicast/unicast, relay/direct connection, V2X/P2X; QoS attribute information needed by UE for sidelink communication, e.g., reliability information; and synchronization reference type information of UE, e.g., Global Navigation Satellite System (GNSS)/eNB/UE.

However, since NR V2X may be applied to unicast and multicast scenarios, and the process of establishing a unicast service by UE in NR is more complicated than the process of establishing a unicast service by UE in LTE, the solution of sidelink reporting in LTE is not suitable for the scenario of sidelink reporting in NR.

Therefore, there is an urgent need in the field for a solution for sidelink reporting in NR.

Figure 3:
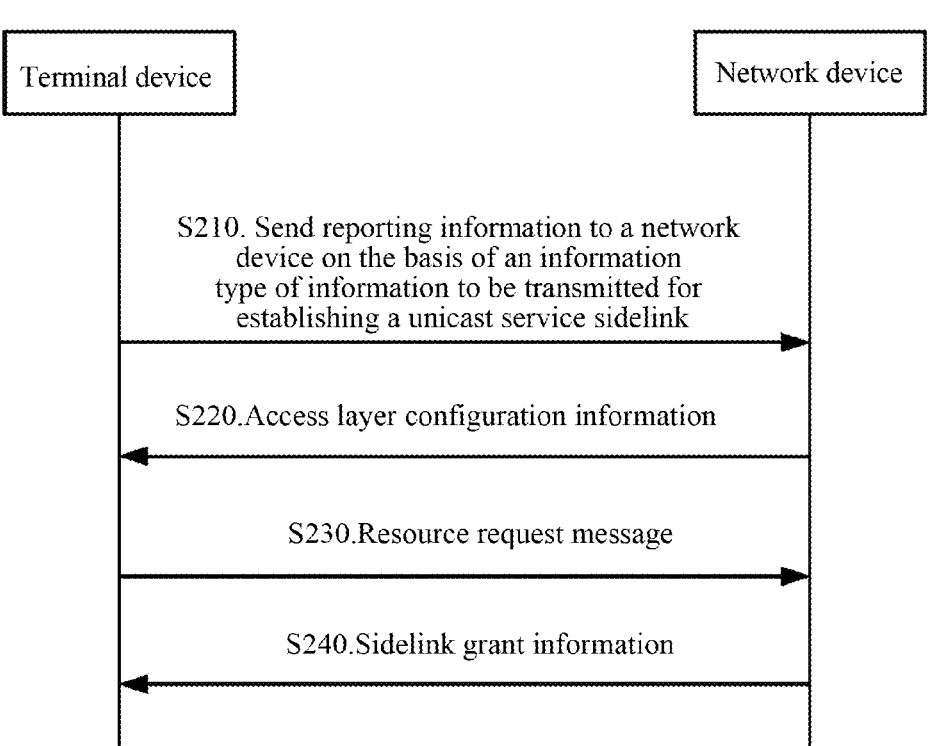
FIG. 3 is a schematic flowchart of a wireless communication method according to an implementation of the present disclosure.

FIG. 3 is a schematic flowchart of a wireless communication method 200 according to an implementation of the present disclosure. The method 200 may be performed interactively by a terminal device and a network device. The terminal device shown in FIG. 3 may be the terminal device as shown in FIG. 1, and the network device shown in FIG. 3 may be the access network device as shown in FIG. 1.

Referring to FIG. 3, the method 200 includes S210.

In S210, the terminal device sends reporting information to the network device based on an information type of information to be transmitted for establishing a unicast service sidelink.

For example, in the process of establishing a sidelink for a unicast service by the terminal device, the terminal device may send reporting information to the network device based on the information type of the information to be transmitted, so that the network device provides access layer configuration information and sidelink grant information for the information to be transmitted based on the reporting information. The access layer configuration information may be used for sending a resource request message to the network device by the terminal device to request the network device to send the sidelink grant information of the information to be transmitted to the terminal device.

In order to facilitate understanding of the solution of the present disclosure, the process of establishing a sidelink by the terminal device is described below with reference to FIG. 4.

Figure 4:
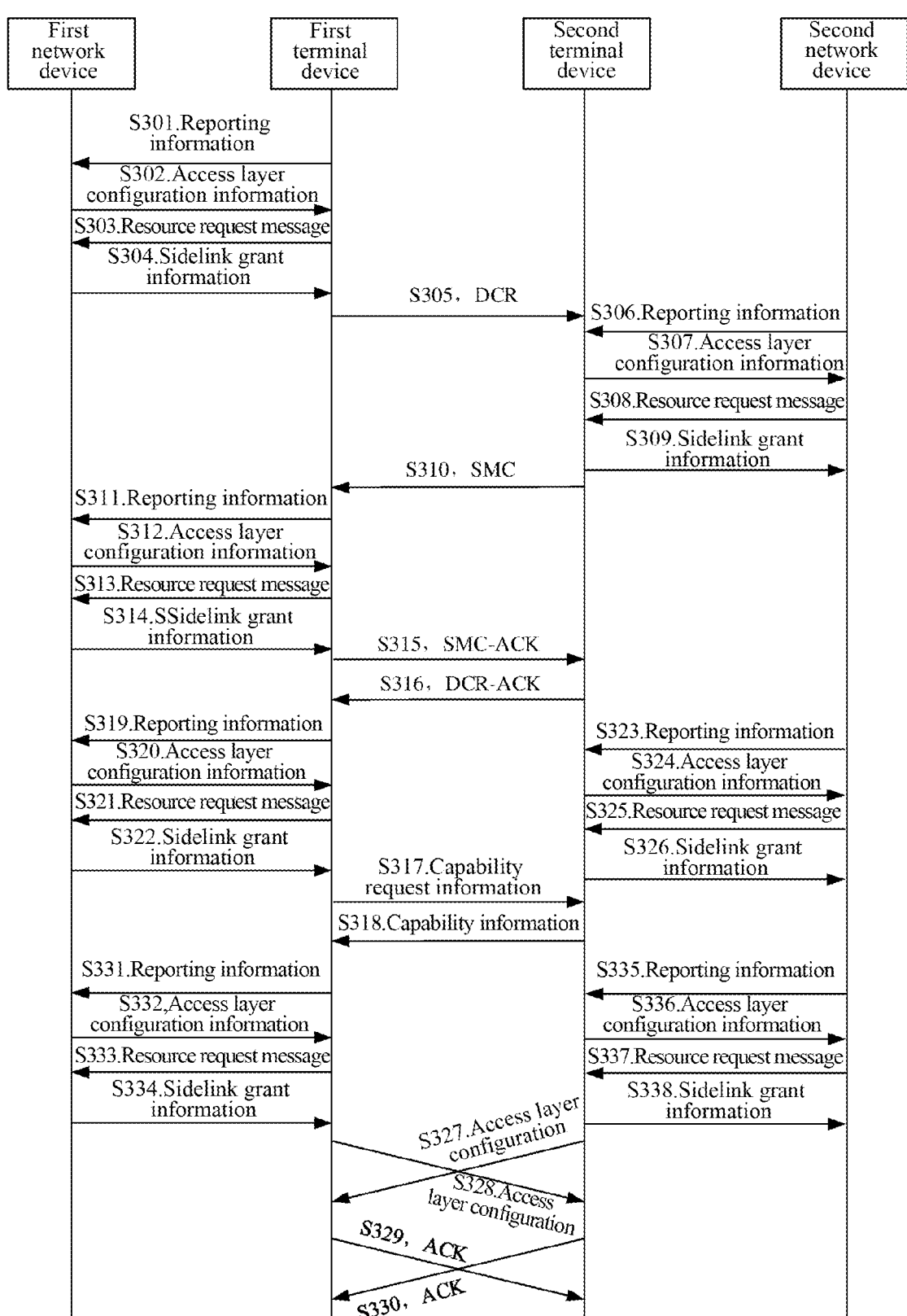
FIG. 4 is another schematic flowchart of a wireless communication method according to an implementation of the present disclosure.

FIG. 4 is another schematic flowchart of a wireless communication method 300 according to an implementation of the present disclosure. The first terminal device and the second terminal device in the method 300 are different terminal devices, and both the first terminal device and the second terminal device may be used to perform the method 200 shown in FIG. 3.

As shown in FIG. 4, the method 300 may include part or all of the following contents.

In S305, the first terminal device sends a Direct Communication Request (DCR) to the second terminal device to request establishment of a sidelink between the first terminal device and the second terminal device.

In S310, the second terminal device sends a Security Management Configuration (SMC) to the first terminal device, the SMC being used for establishing a security mechanism of the sidelink between the first terminal device and the second terminal device.

In S315, the first terminal device sends SMC-ACK to the second terminal device.

In S316, the second terminal device sends DCR-ACK to the first terminal device.

In S317, the first terminal device sends capability request information to the second terminal device.

In S318, the second terminal device sends capability information to the first terminal device, which includes capability information of the second terminal device.

In S327, the first terminal device sends an Access layer configuration to the second terminal device.

In S328, the second terminal device sends an Access layer configuration to the first terminal device.

In S329, the first terminal device sends acknowledgement (ACK) of the Access layer configuration to the second terminal device.

In S330, the second terminal device sends ACK of the Access layer configuration to the first terminal device.

In an implementation of the present disclosure, the messages in the process of establishing a sidelink by the first terminal device and the second terminal device may be divided into multiple types of messages, so that the terminal device may send the reporting information to the network device based on the information type of the information to be transmitted for establishing a unicast service sidelink. For example, the messages in the process of establishing a sidelink based on a unicast service may be divided into PC5-S messages, PC5-RRC messages and sidelink data radio bearer messages.

In other words, in S210, the information to be transmitted includes any one of the following types of messages: PC5-S messages, PC5-RRC messages and sidelink data radio bearer messages.

In other words, the first terminal device or the second terminal device may send the reporting information to the network device based on the information type of the information to be transmitted.

For example, when the information to be transmitted is a PC5-S message, the first terminal device or the second terminal device may send the reporting information corresponding to the PC5-S message to the corresponding network device. In another example, when the information to be transmitted is a PC5-RRC message, the first terminal device or the second terminal device may send the reporting information corresponding to the PC5-RRC message to the corresponding network device. In a further example, when the information to be transmitted is a sidelink data radio bearer message, the first terminal device or the second terminal device may send the reporting information corresponding to the sidelink data radio bearer message to the corresponding network device.

In some implementations of the present disclosure, the PC5-S message may include DCR (i.e., the message sent in S305 in the method 300), and may also include SMC (i.e., the message sent in S310), SMC-ACK (i.e., the message sent in S315 in the method 300), and DCR-ACK (i.e., the message sent in S316 in the method 300). The PC5-RRC message may include capability request information (i.e., the message sent in S317 in the method 300), capability information (i.e., the message sent in S318 in the method 300), Access layer configuration (i.e., the messages sent in S327 and S328 in the method 300) and ACK of Access layer configuration (i.e., the messages sent in S329 and S330 in the method 300). The sidelink data radio bearer message may include a data message.

The transmission mode used for the first PC5-S message (i.e., DCR) among the PC5-S messages may be broadcast, the layer 2 address is a broadcast address, and the PC5-S has no associated QoS information. The transmission mode used for the PC5-S messages (i.e., SMC, SMC-ACK, and DCR-ACK), except the first PC5-S message, may be unicast, the layer 2 address is a unicast address, and the PC5-S has no corresponding QoS information. The transmission mode used for the PC5-RRC messages may be unicast, the layer 2 address is unicast address, and the PC5-RRC has no corresponding QoS information. The transmission mode used for the sidelink data radio bearer messages may be unicast, the layer 2 address is a unicast address, and the sidelink data radio bearer messages have corresponding QoS information.

Therefore, it can be found that for the messages in the sidelink establishment process of a unicast service, the first PC5-S message needs to be transmitted in the transmission mode of broadcast, and the remaining messages need to be transmitted in the transmission mode of unicast. In addition, there is no corresponding QoS information in the messages except the sidelink data radio bearer messages.

In the wireless communication method provided according to an implementation of the present disclosure, the terminal device may send reporting information to the network device based on the information type of the information to be transmitted for establishing a unicast service sidelink. Therefore, for each type of information, appropriate information may be reported to the network device, so that the network device allocates appropriate access layer configuration and sidelink grant information to the terminal device, which is suitable for the establishment process of a sidelink in the above scenario.

In some implementations of the present disclosure, the reporting information includes at least one of:

first indication information for indicating the transmission mode of the information to be transmitted;

an address of the information to be transmitted;

second indication information for indicating the information type of the information to be transmitted; and quality of service (QoS) information corresponding to the information to be transmitted.

In some implementations of the present disclosure, the transmission mode of the information to be transmitted includes unicast or broadcast.

In some implementations of the present disclosure, the address of the information to be transmitted includes at least one of: a source address, a target address, an application layer address and a layer 2 address.

For example, assuming that the transmission mode of the information to be transmitted is broadcast, the address of the information to be transmitted may be a broadcast address, which may include at least one of: a source address, a target address, an application layer address and a layer 2 address. Assuming that the transmission mode of the information to be transmitted is unicast, the address of the information to be transmitted may be a unicast address, which may include at least one of: a source address, a target address, an application layer address and a layer 2 address.

In some implementations of the present disclosure, the second indication information indicates the information type of the information to be transmitted through at least one of at least one logical channel identifier, at least one logical channel group identifier and at least one bearer identifier.

Taking a logical channel identifier as an example, the PC5-S message, the PC5-RRC message and the sidelink data radio bearer message may include at least one first logical channel identifier, at least one second logical channel identifier and at least one third logical channel identifier, respectively, and the at least one first logical channel identifier, the at least one second logical channel identifier and the at least one third logical channel identifier are different from each other.

In some implementations of the present disclosure, the quality of service (QoS) information corresponding to the information to be transmitted includes:

QoS information for the information to be transmitted; and/or,

QoS information for the unicast service.

For example, the terminal device may acquire the quality of service (QoS) information corresponding to the information to be transmitted indicated by a non-access layer. In other words, the terminal device may acquire the quality of service (QoS) information corresponding to the information to be transmitted from the higher layer (also referred to as the upper layer) of the terminal device.

The implementation mode of the first indication information will be described below.

In some implementations of the present disclosure, the first indication information may indicate the transmission mode of the information to be transmitted through the information type of the information to be transmitted, or the second indication information may indicate the information type of the information to be transmitted through the transmission mode of the information to be transmitted.

The case that the first indication information indicates the transmission mode of the information to be transmitted through the information type of the information to be transmitted is taken as an example. In an implementation mode, if the information to be transmitted is the first PC5-S message, the first indication information is used for indicating that the transmission mode of the information to be transmitted is broadcast. In another implementation mode, if the information to be transmitted is a PC5-S message other than the first PC5-S message, the first indication information is used for indicating that the transmission mode of the information to be transmitted is unicast. In a further implementation mode, if the information to be transmitted is a PC5-RRC message or a sidelink data radio bearer message, the first indication information is used for indicating that the transmission mode of the information to be transmitted is unicast.

In some implementations of the present disclosure, the method 200 further includes S220, S230 and S240.

In S220, the terminal device receives the access layer configuration information of the information to be transmitted sent by the network device.

In S230, the terminal device sends a resource request message of the information to be transmitted to the network device. For example, the terminal device may send the resource request message to the network device based on the access layer configuration information sent by the network device.

In S240, the terminal device receives the sidelink grant information of the information to be transmitted sent by the network device, the sidelink grant information being used for the terminal device to send the information to be transmitted by the terminal device. For example, after sending the resource request message to the network device, the terminal device receives the sidelink grant information sent by the network device.

In some implementations of the present disclosure, the access layer configuration information includes configuration information for an access layer entity.

In some implementations of the present disclosure, the access layer entity includes at least one of:

a packet data convergence protocol (PDCP), a radio link control (RLC) and a media access control (MAC).

In some implementations of the present disclosure, the resource request message includes a resource request (SR)/a buffer status report (BSR).

In some implementations of the present disclosure, the sidelink grant information includes a resource for the address of the information to be transmitted and/or an identifier for a logical channel of the information to be transmitted.

The method 200 shown in FIG. 3 will be described below with reference to the scenario shown in FIG. 4.

First Implementation:

Assuming that the information to be transmitted in S210 is the first PC5-S message (i.e., DCR), before the first terminal device sends DCR to the second terminal device, the first terminal device may send reporting information to a first network device to which the first terminal device belongs.

For example, as shown in FIG. 4, the method 300 may further include S301 to S304.

In S301, the first terminal device sends reporting information to the first network device.

For example, the first terminal device reports a sending demand about the PC5-S message to the first network device, which may specifically include the following contents: indicating a transmission type of the information to be transmitted, wherein the first terminal device may report the PC5-S message as a broadcast service to the first network device, and optionally, it may report a broadcast address (a source address/a target address, an application layer address/a layer 2 address) used for transmission, or the first terminal device may report the PC5-S message as a unicast service to the first network device, and optionally, it may report a unicast address (a source address/a target address, an application layer address/a layer 2 address) associated with the PC5-S message;

indicating that the information to be transmitted is a PC5-S message, wherein the information to be transmitted may be specifically indicated as the PC5-S message through at least one of a logical channel identifier, a logical channel group identifier and a bearer identifier; and indicating the QoS information of the information to be transmitted, wherein the QoS information may specifically be QoS information for the PC5-S information to be transmitted indicated by the upper layer or QoS information for a unicast service associated with PC5-S.

In S302, the first network device sends access layer configuration information to the first terminal device.

For example, the first network device sends access layer configuration information to the first terminal device. The access layer configuration is used for configuring an access layer entity for sending PC5-S message, e.g., PDCP/RLC/MAC related configuration, wherein the configuration about a logical channel may include PUCCH resources that can be used when triggering SR and/or LCG configuration that can be used when triggering BSR.

In S303, the first terminal device sends resource request message to the first network device.

For example, the first terminal device sends SR/BSR to the first network device to apply for resources, and the resources may include PUCCH resources and/or LCG configuration of the access layer entity in S302.

In S304, the first network device sends sidelink grant information to the first terminal device.

For example, the first network device may provide a sidelink resource for PC5-S message transmission, and the sidelink resource may be designated as an address for the PC5-S message or as a logical channel for the PC5-S message.

Second Implementation:

Assuming that the information to be transmitted in S210 is a PC5-S message (i.e., SMC, SMC-ACK and DCR-ACK) other than the first PC5-S message, or the information to be transmitted is a PC5-RRC message (i.e., request information and capability information), before the first terminal device sends the information to be transmitted to the second terminal device, the first terminal device may send reporting information to the first network device to which the first terminal device belongs, or before the second terminal device sends the information to be transmitted to the first terminal device, the second terminal device may send reporting information to a second network device to which the second terminal device belongs.

As shown in FIG. 4, assuming that the information to be transmitted is SMC, the method 300 may further include S306 to S309.

In S306, the second terminal device sends the reporting information to the second network device.

For example, the second terminal device reports the reporting information about the PC5-S message to the second network device, which may specifically include the following contents:

indicating a transmission type of the information to be transmitted, wherein the second terminal device may report the PC5-S message as a unicast service to the second network device, and optionally, it may report a unicast address (a source address/a target address, an application layer address/a layer 2 address) associated with the PC5-S message;

indicating that the information to be transmitted is a PC5-S message, wherein the information to be transmitted may be specifically indicated as the PC5-S message through at least one of a logical channel identifier, a logical channel group identifier and a bearer identifier; and indicating the QoS information of the information to be transmitted, wherein the QoS information may specifically be QoS information for the PC5-S information to be transmitted indicated by the upper layer or QoS information for a unicast service associated with PC5-S.

In S307, the second network device sends access layer configuration information to the second terminal device.

For example, the second network device sends access layer configuration information to the second terminal device. The access layer configuration information may be used for configuring an access layer entity for sending the PC5-S message, e.g., PDCP/RLC/MAC related configuration, wherein the configuration about a logical channel may include PUCCH resources that can be used when triggering SR and/or LCG configuration that can be used when triggering BSR.

In S308, the second terminal device sends resource request message to the second network device.

For example, the second terminal device sends SR/BSR to the second network device to apply for resources, and the resources are PUCCH resources and/or LCG configuration of the access layer entity in S307.

In S309, the second network device sends the sidelink grant information to the second terminal device.

For example, the second network device provides a resource for PC5-S message transmission, and the resource may be designated as an address for the PC5-S message and/or as a logical channel for the PC5-S message.

As shown in FIG. 4, assuming that the information to be transmitted is SMC-ACK, the method 300 may further include S311 to S314.

In S311, the first terminal device sends reporting information to the first network device.

For example, the first terminal device reports the reporting information about the PC5-S message to the first network device, which may specifically include the following contents:

indicating a transmission type of the information to be transmitted, wherein the first terminal device may report the PC5-S message as a unicast service to the first network device, and optionally, it may report a unicast address (a source address/a target address, an application layer address/a layer 2 address) associated with the PC5-S message;

indicating that the information to be transmitted is a PC5-S message, wherein the information to be transmitted may be specifically indicated as the PC5-S message through at least one of a logical channel identifier, a logical channel group identifier and a bearer identifier; and indicating QoS information of the information to be transmitted, wherein the QoS information may specifically be QoS information for the PC5-S information to be transmitted indicated by the upper layer or QoS information for a unicast service associated with PC5-S.

In S312, the first network device sends access layer configuration information to the first terminal device.

For example, the first network device sends access layer configuration information to the first terminal device. The access layer configuration information may be used for configuring an access layer entity sending PC5-S message, for example, the access layer configuration information may include PDCP/RLC/MAC related configuration, wherein the configuration about a logical channel may include PUCCH resources that can be used when triggering SR and/or LCG configuration that can be used when triggering BSR.

In S313, the first terminal device sends resource request message to the first network device.

For example, the first terminal device sends SR/BSR to the first network device to apply for resources, and the resources may include PUCCH resources and/or LCG configuration of the access layer entity in S312.

In S314, the first network device sends sidelink grant information to the first terminal device.

For example, the first network device may provide a sidelink resource for PC5-S message transmission, and the sidelink resource may be designated as an address for the PC5-S message or as a logical channel for the PC5-S message.

As shown in FIG. 4, assuming that the information to be transmitted is capability request information, the method 300 may further include S319 to S322.

In S319, the first terminal device sends reporting information to the first network device.

For example, the first terminal device reports reporting information about the PC5-RRC message to the first network device, which may specifically include the following contents:

indicating a transmission type of the information to be transmitted, wherein the first terminal device may report the PC5-RRC message as a unicast service to the first network device, and optionally, it may report a unicast address (a source address/a target address, an application layer address/a layer 2 address) associated with the PC5-RRC message;

indicating that the information to be transmitted is a PC5-RRC message, wherein the information to be transmitted may be specifically indicated as the PC5-RRC message through at least one of a logical channel identifier, a logical channel group identifier and a bearer identifier; and indicating QoS information of the information to be transmitted, wherein the QoS information may specifically be QoS information for the PC5-RRC information to be transmitted indicated by the upper layer or QoS information for a unicast service associated with PC5-RRC.

In S320, the first network device sends access layer configuration information to the first terminal device.

For example, the first network device sends access layer configuration information to the first terminal device. The access layer configuration information may be used for configuring an access layer entity sending PC5-RRC message, for example, the access layer configuration information may include PDCP/RLC/MAC related configuration, wherein the configuration about a logical channel may include PUCCH resources that can be used when triggering SR and/or LCG configuration that can be used when triggering BSR.

In S321, the first terminal device sends resource request message to the first network device.

For example, the first terminal device sends SR/BSR to the first network device to apply for resources, and the resources may include PUCCH resources and/or LCG configuration of the access layer entity in S320.

In S322, the first network device sends sidelink grant information to the first terminal device.

For example, the first network device may provide a sidelink resource for PC5-RRC message transmission, and the sidelink resource may be designated as an address for the PC5-RRC message or as a logical channel for the PC5-RRC message.

As shown in FIG. 4, assuming that the information to be transmitted is capability request information, the method 300 may further include S323 to S326.

In S323, the second terminal device sends reporting information to the second network device.

For example, the second terminal device reports reporting information about the PC5-RRC message to the second network device, which may specifically include the following contents:

indicating a transmission type of the information to be transmitted, wherein the second terminal device may report the PC5-RRC message as a unicast service to the second network device, and optionally, it may report a unicast address (a source address/a target address, an application layer address/a layer 2 address) associated with the PC5-RRC message;

indicating that the information to be transmitted is a PC5-RRC message, wherein the information to be transmitted may be specifically indicated as the PC5-RRC message through at least one of a logical channel identifier, a logical channel group identifier and a bearer identifier; and indicating QoS information of the information to be transmitted, wherein the QoS information may specifically be QoS information for the PC5-RRC information to be transmitted indicated by the upper layer or QoS information for a unicast service associated with PC5-RRC.

In S324, the second network device sends access layer configuration information to the second terminal device.

For example, the second network device sends access layer configuration information to the second terminal device. The access layer configuration information may be used for configuring an access layer entity sending PC5-RRC message, e.g., PDCP/RLC/MAC related configuration, wherein the configuration about a logical channel may include PUCCH resources that can be used when triggering SR and/or LCG configuration that can be used when triggering BSR.

In S325, the second terminal device sends resource request message to the second network device.

For example, the second terminal device sends SR/BSR to the second network device to apply for resources, and the resources are PUCCH resources and/or LCG configuration of the access layer entity in S324.

In S326, the second network device sends sidelink grant information to the second terminal device.

For example, the second network device provides a resource for PC5-RRC message transmission, and the resource may be designated as an address for the PC5-RRC message and/or as a logical channel for the PC5-RRC message.

Third Implementation:

Assuming that the information to be transmitted in S210 is a sidelink data radio bearer message, such as Access layer configuration, before the first terminal device sends the information to be transmitted to the second terminal device, the first terminal device may send reporting information to the first network device to which the first terminal device belongs, or before the second terminal device sends the information to be transmitted to the first terminal device, the second terminal device may send reporting information to the second network device to which the second terminal device belongs.

As shown in FIG. 4, assuming that the information to be transmitted is an Access layer configuration to be sent by the first terminal device to the second terminal device, the method 300 may further include S331 to S334.

In S331, the first terminal device sends reporting information to the first network device.

For example, the first terminal device reports reporting information about a sidelink data radio bearer message to the first network device, which may specifically include the following contents:

indicating a transmission type of the information to be transmitted, wherein the first terminal device may report the sidelink data radio bearer message as a unicast service to the first network device, and optionally, it may report a unicast address (a source address/a target address, an application layer address/a layer 2 address) associated with the sidelink data radio bearer message;

indicating that the information to be transmitted is a sidelink data radio bearer message, wherein the information to be transmitted may be specifically indicated as the sidelink data radio bearer message through at least one of a logical channel identifier, a logical channel group identifier and a bearer identifier; and indicating QoS information of the information to be transmitted, wherein the QoS information may specifically be QoS information for the sidelink data radio bearer information to be transmitted indicated by the upper layer or QoS information for a unicast service associated with the sidelink data radio bearer message.

In S332, the first network device sends access layer configuration information to the first terminal device.

For example, the first network device sends access layer configuration information to the first terminal device. The access layer configuration is used for configuring an access layer entity sending the sidelink data radio bearer message, e.g., PDCP/RLC/MAC related configuration, wherein the configuration about a logical channel may include PUCCH resources that can be used when triggering SR and/or LCG configuration that can be used when triggering BSR.

In S333, the first terminal device sends resource request message to the first network device.

For example, the first terminal device sends SR/BSR to the first network device to apply for resources, and the resources may include PUCCH resources and/or LCG configuration of the access layer entity in S332.

In S334, the first network device sends sidelink grant information to the first terminal device.

For example, the first network device may provide a sidelink resource for the transmission of the sidelink data radio bearer message, and the sidelink resource may be designated as an address for the sidelink data radio bearer message or as a logical channel for the sidelink data radio bearer message.

As shown in FIG. 4, assuming that the information to be transmitted is an Access layer configuration to be sent by the second terminal device to the first terminal device, the method 300 may further include S335 to S338.

In S335, the second terminal device sends reporting information to the second network device.

For example, the second terminal device reports reporting information about the sidelink data radio bearer message to the second network device, which may specifically include the following contents:

indicating a transmission type of the information to be transmitted, wherein the second terminal device may report the sidelink data radio bearer message as a unicast service to the second network device, and optionally, it may report a unicast address (a source address/a target address, an application layer address/a layer 2 address) associated with the sidelink data radio bearer message;

indicating that the information to be transmitted is a sidelink data radio bearer message, wherein the information to be transmitted may be specifically indicated as the sidelink data radio bearer message through at least one of a logical channel identifier, a logical channel group identifier and a bearer identifier; and indicating QoS information of the information to be transmitted, wherein the QoS information may specifically be QoS information for the sidelink data radio bearer information to be transmitted indicated by the upper layer or QoS information for a unicast service associated with the sidelink data radio bearer message.

In S336, the second network device sends access layer configuration information to the second terminal device.

For example, the second network device sends access layer configuration information to the second terminal device. The access layer configuration is used for configuring an access layer entity sending the sidelink data radio bearer message, e.g., PDCP/RLC/MAC related configuration, wherein the configuration about a logical channel may include PUCCH resources that can be used when triggering SR and/or LCG configuration that can be used when triggering BSR.

In S337, the second terminal device sends resource request message to the second network device.

For example, the second terminal device sends SR/BSR to the second network device to apply for resources, and the resources may include PUCCH resources and/or LCG configuration of the access layer entity in S336.

In S338, the second network device sends sidelink grant information to the second terminal device.

For example, the second network device may provide a sidelink resource for the transmission of the sidelink data radio bearer message, and the sidelink resource may be designated as an address for the sidelink data radio bearer message or as a logical channel for the sidelink data radio bearer message.

The preferred implementations of the present disclosure have been described in detail above with reference to the accompanying drawings. However, the present disclosure is not limited to specific details of the implementations described above, and various simple variations may be made to the technical solutions of the present disclosure within the technical conception scope of the present disclosure, and these simple variations are all within the protection scope of the present disclosure.

For example, various specific technical features described in the specific implementations above may be combined in any suitable mode if there is no conflict. In order to avoid unnecessary repetition, various possible combination modes will not be further explained in the present disclosure.

In another example, various different implementations of the present disclosure may be combined arbitrarily as long as they do not violate the idea of the present disclosure, and the combinations should be regarded as the contents disclosed in the present disclosure as well.

It should be understood that sequence numbers of the foregoing processes do not mean execution sequences in various method implementations of the present disclosure. The execution sequences of the processes should be determined according to functions and internal logics of the processes, and should not be construed as any limitation on the implementation processes of the implementations of the present disclosure.

For example, S315 and S317 in FIG. 4 may be combined into one step.

In another example, S316 and S318 in FIG. 4 may be combined into one step.

In a further example, S327 and S328 in FIG. 4 may be performed simultaneously.

In a further example, S329 and S330 in FIG. 4 may be performed simultaneously.

In the above implementations, before the information to be transmitted (PC5-S/PC5-RRC signaling) is sent in the unicast connection establishment process, the terminal device may send reporting information for the information type of the information to be transmitted, but the present disclosure is not limited to this.

The present disclosure further provides a wireless communication method to simplify the method 200.

In some implementations of the present disclosure, the terminal device may send indication information to the network device, the indication information being used for indicating the network device to send access layer configuration information and/or sidelink grant information of the information to be transmitted, and the information to be transmitted being information for establishing a unicast service sidelink. That is, after receiving the indication information, the network device sends the access layer configuration information and/or the sidelink grant information to the terminal device. Further, after sending the indication information, the terminal device receives the access layer configuration information and/or the sidelink grant information sent by the network device.

For example, the terminal device may receive, through a system broadcast message, the access layer configuration information and/or the sidelink grant information sent by the network device.

For example, the information to be transmitted is a PC5-S message and/or a PC5-RRC message.

In some implementations of the present disclosure, the terminal device may acquire pre-configured access layer configuration information and/or sidelink grant information of information to be transmitted, the information to be transmitted being information for establishing a unicast service sidelink.

For example, the information to be transmitted is a PC5-S message and/or a PC5-RRC message.

In an implementation of the present disclosure, the terminal device does not need to acquire relevant configuration of the access layer entity through service reporting, but performs relevant configuration (PDCP/RLC/MAC) of the access layer entity based on configuration/pre-configuration/system broadcast message predefined through protocol. The configurations here may be unified configurations without distinguishing the target addresses. Alternatively, although the terminal device needs to acquire relevant configuration of the access layer entity through service reporting, different target addresses are not distinguished for this reporting, but the need for sending a PC5-S/-RRC message is reported to the network. The configurations issued by the network device may also be unified configurations without distinguishing target addresses, which may effectively simplify the process of the method 200 to save signaling overhead.

Similarly, the terminal device does not need to acquire relevant parameters of resources through service reporting, such as a target address identifier, a LCG identifier, an SR resource, etc. needed by a BSR in mode-A and resource pool information needed in Mode-B, but acquires relevant parameters of a BSR/SR/resource pool based on configuration/ pre-configuration/system broadcast message predefined through protocol. Furthermore, these parameters may be unified configurations without distinguishing target addresses. Alternatively, although the terminal device needs to acquire relevant parameters of resources through service reporting, different target addresses are not distinguished for this reporting, but the need for sending a PC5-S/-RRC message is reported to the network device. The configurations issued by the network device may also be unified configurations without distinguishing target addresses, which may effectively simplify the process of the method 200 to save signaling overhead.

The present disclosure provides a reporting method for a multicast service to realize transmission of the multicast service.

In some implementations of the present disclosure, the terminal device may send reporting information of information to be transmitted to the network device, the information to be transmitted being used for a multicast service sidelink.

For example, in order for the terminal device to determine whether an HARQ feedback needs to be performed for data to be sent by the terminal device, the terminal device may send the reporting information to the network device to which the terminal device belongs.

In some implementations of the present disclosure, the reporting information includes at least one of:

information of the number of members;

information on whether the number of group members is determined; and information of group communication category.

For example, the reporting information may include at least one of indication information for indicating the number of members, indication information for indicating whether the number of group members is determined or undetermined, and indication information for indicating a group communication category.

Among them, the group member data may be determined or undetermined, which is not limited in the present disclosure.

It should be understood that in the implementations of the present disclosure, the expression form of the information of group communication category is not limited. For example, the information of group communication category may have different expression forms. For example, multicast services may be divided into several type groups, among which the group members of some groups may be determined, and the group members of some groups may be undetermined. In such a case, the information of group communication category may only be used to reflect services, i.e., the information of group communication category may indicate whether the number of members in the combined communication is determined or undetermined. Of course, the information of group communication category may also indicate the specific type group to which the multicast service belongs.

Further, after the terminal device completes sending the reporting information to the network device, the terminal device may receive configuration information for configuring the HARQ feedback mode of the multicast service sent by the network device. In other words, after receiving the reporting information, the network device may send the configuration information to the terminal device.

Therefore, after acquiring the configuration information and receiving the information sent by the peer terminal, the terminal device may determine, based on the configuration information, whether a Hybrid Automatic Repeat Request (HARQ) feedback needs to be performed.

For example, the HARQ feedback mode includes a first HARQ feedback mode and a second HARQ feedback mode, the first HARQ feedback mode means that HARQ feedback needs to be performed for the multicast service, and the second HARQ feedback mode means that HARQ feedback does not need to be performed for the multicast service.

Method implementations of the present disclosure are described in detail above in combination with FIGS. 1 to 4. Device implementations of the present disclosure are described in detail below in combination with FIGS. 5 to 8.

Figure 5:
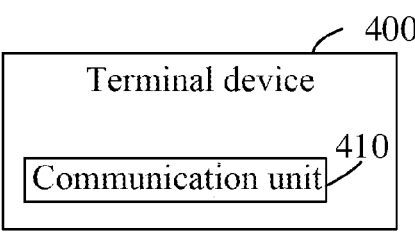
FIG. 5 is a schematic block diagram of a terminal device according to an implementation of the present disclosure.

FIG. 5 is a schematic block diagram of a terminal device 400 according to an implementation of the present disclosure.

Referring to FIG. 5, in some implementations of the present disclosure, the terminal device 400 may include a communication unit 410.

The communication unit 410 is configured to send reporting information to a network device based on an information type of information to be transmitted for establishing a unicast service sidelink.

In some implementations of the present disclosure, the reporting information includes at least one of:

first indication information for indicating a transmission mode of the information to be transmitted;

an address of the information to be transmitted;

second indication information for indicating the information type of the information to be transmitted; and Quality of service (QoS) information corresponding to the information to be transmitted.

In some implementations of the present disclosure, the transmission mode of the information to be transmitted includes unicast or broadcast.

In some implementations of the present disclosure, the address of the information to be transmitted includes at least one of:

a source address, a target address, an application layer address, and a layer 2 address.

In some implementations of the present disclosure, the information to be transmitted includes at least one of:

a PC5-S message, a PC5-RRC message, and a sidelink data radio bearer message.

In some implementations of the present disclosure, the second indication information indicates the information type of the information to be transmitted through at least one of at least one logical channel identifier, at least one logical channel group identifier and at least one bearer identifier.

In some implementations of the present disclosure, the quality of service (QoS) information corresponding to the information to be transmitted includes:

QoS information for the information to be transmitted; and/or, QoS information for the unicast service.

In some implementations of the present disclosure, the communication unit 410 is further configured to:

acquire the QoS information corresponding to the information to be transmitted indicated by a non-access layer.

In some implementations of the present disclosure, if the information to be transmitted is the first PC5-S message, the first indication information is used for indicating that the transmission mode of the information to be transmitted is broadcast.

In some implementations of the present disclosure, if the information to be transmitted is a PC5-S message other than the first PC5-S message, the first indication information is used for indicating that the transmission mode of the information to be transmitted is unicast.

In some implementations of the present disclosure, if the information to be transmitted is a PC5-RRC message or a sidelink data radio bearer message, the first indication information is used for indicating that the transmission mode of the information to be transmitted is unicast.

In some implementations of the present disclosure, the communicate unit 410 is further configured to perform at least one of:

receiving access layer configuration information of the information to be transmitted sent by the network device;

sending a resource request message of the information to be transmitted to the network device; and receiving sidelink grant information of the information to be transmitted sent by the network device, the sidelink grant information being used for the terminal device to send the information to be transmitted.

In some implementations of the present disclosure, the access layer configuration information includes configuration information for an access layer entity.

In some implementations of the present disclosure, the access layer entity includes at least one of:

a packet data convergence protocol (PDCP), a radio link control (RLC) and a media access control (MAC).

In some implementations of the present disclosure, the resource request message includes a resource request (SR)/a buffer status report (BSR).

In some implementations of the present disclosure, the sidelink grant information includes a resource for an address of the information to be transmitted and/or an identifier for a logical channel of the information to be transmitted.

Referring to FIG. 5, in some other implementations of the present disclosure, the terminal device 400 may include a communication unit 410.

The communication unit 410 is configured to send indication information to a network device, the indication information being used for indicating the network device to send access layer configuration information and/or sidelink grant information of information to be transmitted, the information to be transmitted being information for establishing a unicast service sidelink.

In some implementations of the present disclosure, the communication unit 410 is further configured to:

receive the access layer configuration information and/or the sidelink grant information sent by the network device.

In some implementations of the present disclosure, the communication unit 410 is specifically configured to:

receive, through a system broadcast message, the access layer configuration information and/or the sidelink grant information sent by the network device.

In some implementations of the present disclosure, the information to be transmitted is a PC5-S message and/or a PC5-RRC message.

Referring to FIG. 5, in some other implementations of the present disclosure, the terminal device 400 may include a communication unit 410.

The communication unit 410 is configured to acquire pre-configured access layer configuration information and/or sidelink grant information of information to be transmitted, the information to be transmitted being information for establishing a unicast service sidelink.

In some implementations of the present disclosure, the information to be transmitted is a PC5-S message and/or a PC5-RRC message.

Referring to FIG. 5, in some other implementations of the present disclosure, the terminal device 400 may include a communication unit 410.

The communication unit 410 is configured to send reporting information of information to be transmitted to a network device, the information to be transmitted being used for a multicast service sidelink.

In some implementations of the present disclosure, the reporting information includes at least one of:

information of the number of members;

information on whether the number of group members is determined; and information of group communication category.

In some implementations of the present disclosure, the communication unit 410 is further configured to:

receive configuration information for configuring the HARQ feedback mode of the multicast service sent by the network device.

In some implementations of the present disclosure, the HARQ feedback mode includes a first HARQ feedback mode and a second HARQ feedback mode, the first HARQ feedback mode means that HARQ feedback needs to be performed for the multicast service, and the second HARQ feedback mode means that HARQ feedback does not need to be performed for the multicast service.

It should be understood that the device implementations may correspond to the method implementations each other, and description of the method implementations may be referred to for similar description of the device implementations. Specifically, the terminal device 400 shown in FIG. 5 may correspond to a corresponding subject performing the method 200 in the implementations of the present disclosure, and the above and other operations and/or functions of various units in the terminal device 400 are respectively for realizing corresponding flows of various methods in FIG. 1, which will not be repeated here for brevity.

Figure 6:
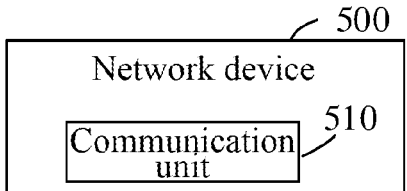
FIG. 6 is a schematic block diagram of a network device according to an implementation of the present disclosure.

FIG. 6 is a schematic block diagram of a network device 500 according to an implementation of the present disclosure.

Referring to FIG. 6, in some implementations of the present disclosure, the network device 500 may include a communication unit 510.

The communication unit 510 is configured to receive reporting information sent by a terminal device based on an information type of information to be transmitted for establishing a unicast service sidelink.

In some implementations of the present disclosure, the reporting information includes at least one of:

first indication information for indicating a transmission mode of the information to be transmitted;

an address of the information to be transmitted;

second indication information for indicating the information type of the information to be transmitted; and quality of service (QoS) information corresponding to the information to be transmitted.

In some implementations of the present disclosure, the transmission mode of the information to be transmitted includes unicast or broadcast.

In some implementations of the present disclosure, the address of the information to be transmitted includes at least one of:

a source address, a target address, an application layer address, and a layer 2 address.

In some implementations of the present disclosure, the information to be transmitted includes at least one of:

a PC5-S message, a PC5-RRC message and a sidelink data radio bearer message.

In some implementations of the present disclosure, the second indication information indicates the information type of the information to be transmitted through at least one of at least one logical channel identifier, at least one logical channel group identifier and at least one bearer identifier.

In some implementations of the present disclosure, the quality of service (QoS) information corresponding to the information to be transmitted includes:

QoS information for the information to be transmitted; and/or, QoS information for the unicast service.

In some implementations of the present disclosure, if the information to be transmitted is the first PC5-S message, the first indication information is used for indicating that the transmission mode of the information to be transmitted is broadcast.

In some implementations of the present disclosure, if the information to be transmitted is a PC5-S message other than the first PC5-S message, the first indication information is used for indicating that the transmission mode of the information to be transmitted is unicast.

In some implementations of the present disclosure, if the information to be transmitted is a PC5-RRC message or a sidelink data radio bearer message, the first indication information is used for indicating that the transmission mode of the information to be transmitted is unicast.

In some implementations of the present disclosure, the communication unit 510 is further configured to:

send access layer configuration information to the terminal device;

receive a resource request message sent by the terminal device based on the access layer configuration information; and send sidelink grant information to the terminal device, the sidelink grant information being used for the terminal device to send the information to be transmitted.

In some implementations of the present disclosure, the access layer configuration information includes configuration information for an access layer entity.

In some implementations of the present disclosure, the access layer entity includes at least one of:

a packet data convergence protocol (PDCP), a radio link control (RLC) and a media access control (MAC).

In some implementations of the present disclosure, the resource request message includes a resource request (SR)/a buffer status report (BSR).

In some implementations of the present disclosure, the sidelink grant information includes a resource for an address of the information to be transmitted and/or an identifier for a logical channel of the information to be transmitted.

Referring to FIG. 6, in some implementations of the present disclosure, the network device 500 may include a communication unit 510.

The communication unit 510 is configured to receive indication information sent by a terminal device, the indication information being used for indicating the network device to send access layer configuration information and/or sidelink grant information of information to be transmitted, the information to be transmitted being information for establishing a unicast service sidelink.

In some implementations of the present disclosure, the communication unit 510 is further configured to:

send the access layer configuration information and/or the sidelink grant information to the terminal device.

In some implementations of the present disclosure, the communication unit 510 is specifically configured to:

send the access layer configuration information and/or the sidelink grant information to the terminal device through a system broadcast message.

In some implementations of the present disclosure, the information to be transmitted is a PC5-S message and/or a PC5-RRC message.

Referring to FIG. 6, in some implementations of the present disclosure, the network device 500 may include a communication unit 510.

The communication unit 510 is configured to receive reporting information of information to be transmitted sent by the terminal device, the information to be transmitted being used for a multicast service sidelink.

In some implementations of the present disclosure, the reporting information includes at least one of:

information of the number of members;

information on whether the number of group members is determined; and information of group communication category.

In some implementations of the present disclosure, the communication unit 510 is further configured to:

send configuration information for configuring the HARQ feedback mode of the multicast service to the terminal device.

In some implementations of the present disclosure, the HARQ feedback mode includes a first HARQ feedback mode and a second HARQ feedback mode, the first HARQ feedback mode means that HARQ feedback needs to be performed for the multicast service, and the second HARQ feedback mode means that HARQ feedback does not need to be performed for the multicast service.

It should be understood that the device implementations may correspond to the method implementations each other, and description of the method implementations may be referred to for similar description of the device implementations. Specifically, the network device 500 shown in FIG. 6 may correspond to a corresponding subject performing the method 200 in the implementations of the present disclosure, and the above and other operations and/or functions of various units in the network device 500 are respectively for realizing corresponding flows of various methods in FIG. 1, which will not be repeated here for brevity.

In the above, the communication device according to an implementation of the present disclosure is described with reference to the drawings from a perspective of a functional module. It should be understood that the functional module may be realized in the form of hardware, or through instructions in the form of software, or through a combination of hardware and software modules.

Specifically, various acts of the method implementations in the implementations of the present disclosure may be implemented by hardware integrated logic circuits and/or instructions in the form of software in a processor, and the acts of methods disclosed with reference to the implementations of the present disclosure may be directly implemented by a hardware decoding processor, or may be implemented by a combination of hardware and software modules in the decoding processor.

Optionally, the software modules may be located in a mature storage medium in the art, such as a random access memory, a flash memory, a read-only memory, a programmable read-only memory, an electrically erasable programmable memory, or a register, etc. The storage medium is located in the memory, and the processor reads information from the memory and completes the acts of the above method implementations in combination with its hardware.

For example, the processing unit and the communication unit referred to above may be implemented by a processor and a transceiver, respectively.

Figure 7:
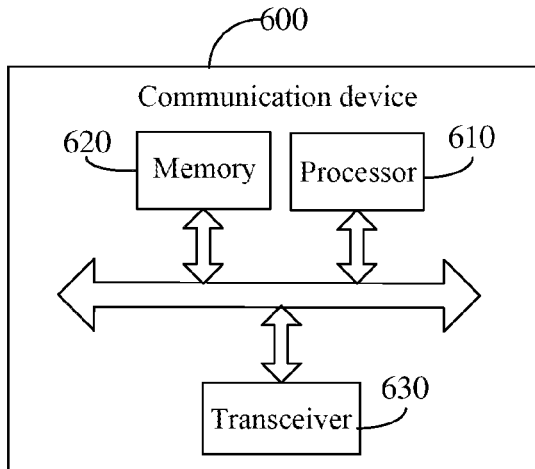
FIG. 7 is a schematic block diagram of a communication device according to an implementation of the present disclosure.

FIG. 7 is a schematic diagram of a structure of a communication device 600 according to an implementation of the present disclosure.

Referring to FIG. 7, the communication device 600 may include a processor 610.

The processor 610 may call and run a computer program from a memory to implement the method in the implementations of the present disclosure.

With continued reference to FIG. 7, the communication device 600 may further include a memory 620.

The memory 620 may be used for storing indication information, or may be used for storing codes, instructions, etc., executed by the processor 610. Herein, the processor 610 may call and run a computer program from the memory 620 to implement the method in the implementations of the present disclosure. The memory 620 may be a separate device independent of the processor 610 or may be integrated in the processor 610.

With continued reference to FIG. 7, the communication device 600 may further include a transceiver 630.

The processor 610 may control the transceiver 630 to communicate with other devices. Specifically, it may send information or data to other devices, or receive information or data sent by other devices. The transceiver 630 may include a transmitter and a receiver. The transceiver 630 may further include antennas, the number of which may be one or more.

It should be understood that various components in the communication device 600 are connected through a bus system. In addition to a data bus, the bus system further includes a power bus, a control bus and a status signal bus.

It should be further understood that the communication device 600 may be a network device according to an implementation of the present disclosure, and the communication device 600 may implement corresponding processes implemented by the network device in various methods of the implementations of the present disclosure. That is to say, the communication device 600 in the implementations of the present disclosure may correspond to the network device 500 in the implementations of the present disclosure, and may correspond to a corresponding subject performing the method 200 according to an implementation of the present disclosure, which will not be described here for brevity. Similarly, the communication device 600 may be a terminal device according to an implementation of the present disclosure, and the communication device 600 may implement corresponding processes implemented by the terminal device in various methods of the implementations of the present disclosure. That is to say, the communication device 600 according to an implementation of the present disclosure may correspond to the terminal device 400 in an implementation of the present disclosure, and may correspond to a corresponding subject performing the method 200 according to an implementation of the present disclosure, which will not be repeated here for brevity.

In addition, an implementation of the present disclosure further provides a chip.

For example, the chip may be an integrated circuit chip with a capability for processing signals, and may implement various methods, acts, and logic block diagrams disclosed in the implementations of the present disclosure. The chip may also be called a system-level chip, a system chip, a chip system or a system-on-chip, etc. Optionally, the chip may be applied to various communication devices, so that the communication devices with the chip installed therein can perform the methods, acts and logic block diagrams disclosed in the implementations of the present disclosure.

Figure 8:
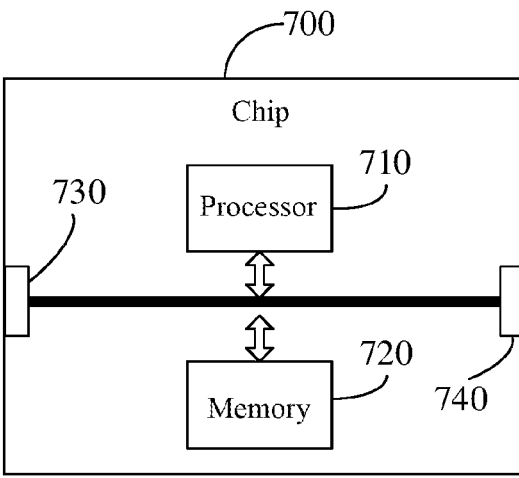
FIG. 8 is a schematic block diagram of a chip according to an implementation of the present disclosure.

FIG. 8 is a schematic diagram of a structure of a chip 700 according to an implementation of the present disclosure.

Referring to FIG. 8, the chip 700 includes a processor 710.

The processor 710 may call and run a computer program from a memory to implement the methods in the implementations of the present disclosure.

With continued reference to FIG. 8, the chip 700 may further include a memory 720.

The processor 710 may call and run a computer program from the memory 720 to implement the methods in the implementations of the present disclosure. The memory 720 may be configured to store indication information, or may be configured to store codes, instructions, etc., executed by the processor 710. The memory 720 may be a separate device independent of the processor 710 or may be integrated in the processor 710.

With continued reference to FIG. 8, the chip 700 may further include an input interface 730.

The processor 710 may control the input interface 730 to communicate with other devices or chips. Specifically, it may acquire information or data sent by other devices or chips.

With continued reference to FIG. 8, the chip 700 may further include an output interface 740.

The processor 710 may control the output interface 740 to communicate with other devices or chips. Specifically, it may output information or data to other devices or chips.

It should be understood that the chip 700 may be applied to the network device in the implementations of the present disclosure, and the chip may implement the corresponding flows implemented by the network device in the various methods in the implementations of the present disclosure, and may also implement the corresponding flows implemented by the terminal device in the various methods in the implementations of the present disclosure, which will not be repeated here for brevity.

It should also be understood that, various components in the chip 700 are connected through a bus system, wherein in addition to a data bus, the bus system further includes a power bus, a control bus and a status signal bus.

The processor may include, but is not limited to: a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component, etc.

The processor may be configured to implement or perform methods, acts and logical block diagrams disclosed in the implementations of the present disclosure. The acts of the methods disclosed in connection with the implementations of the present disclosure may be directly embodied as being executed by the hardware decoding processor, or by a combination of hardware and software modules in the decoding processor. The software modules may be located in a mature storage medium in the art, such as a random access memory, a flash memory, a read-only memory, a programmable read-only memory or an erasable programmable memory, a register, etc. The storage medium is located in the memory, and the processor reads information from the memory and completes the acts of the above methods in combination with its hardware.

The memory includes, but is not limited to: a transitory memory and/or a non-transitory memory; wherein the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. Through an exemplary but not limitative description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a synch link DRAM (SLDRAM), and a Direct Rambus RAM (DR RAM).

It should be noted that the memory described herein intends to include these and any other suitable types of memories.

An implementation of the present disclosure further provides a computer-readable storage medium, configured to store a computer program. The computer-readable storage medium stores one or more programs including instructions which, when executed by a portable electronic device including multiple application programs, cause the portable electronic device to execute methods in the implementations shown for method 200 to method 300.

Optionally, the computer-readable storage medium may be applied to the network device in the implementations of the present disclosure, and the computer program causes a computer to perform the corresponding processes implemented by the network device in various methods in the implementations of the present disclosure, which will not be repeated here for brevity.

Optionally, the computer-readable storage medium may be applied to the mobile terminal/terminal device in the implementations of the present disclosure, and the computer program causes a computer to perform the corresponding processes implemented by the mobile terminal/terminal device in various methods in the implementations of the present disclosure, which will not be repeated herein for brevity.

An implementation of the present disclosure further provides a computer program product, including a computer program.

Optionally, the computer program product may be applied to the network device in the implementations of the present disclosure, and the computer program causes a computer to perform the corresponding processes implemented by the network device in various methods in the implementations of the present disclosure, which will not be repeated here for brevity.

Optionally, the computer program product may be applied to the mobile terminal/terminal device in the implementations of the present disclosure, and the computer program causes a computer to perform the corresponding processes implemented by the mobile terminal/terminal device in various methods in the implementations of the present disclosure, which will not be repeated here for brevity.

An implementation of the present disclosure further provides a computer program, which, when executed by a computer, causes the computer to execute the methods in the implementations shown for method 200 to method 300.

Optionally, the computer program may be applied to the network device in the implementations of the present disclosure. The computer program, when run on a computer, causes the computer to perform the corresponding processes implemented by the network device in various methods in the implementations of the present disclosure, which will not be repeated here for brevity.

In addition, an implementation of the present disclosure further provides a communication system, which may include the above-mentioned terminal device and network device, to form the communication system 100 shown in FIG. 1, which will not be repeated here for brevity. It should be noted that the term "system" in this specification may also be referred to as "network management architecture" or "network system", etc.

It should also be understood that the terms used in the implementations of the present disclosure and the appended claims are for the purpose of describing specific implementations only, but are not intended to limit the implementations of the present disclosure.

For example, the singular forms "a", "said", "the above" and "the" used in the implementations of the present disclosure and the appended claims are also intended to include the plural forms unless the context clearly indicates other meanings.

Those skilled in the art may recognize that the exemplary units and algorithm acts described in combination with the implementations disclosed herein can be implemented in electronic hardware, or a combination of computer software and electronic hardware. Whether these functions are implemented in hardware or software depends on a specific application and design constraints of the technical solution. Those skilled in the art may use different methods to implement the described functions in respect to each particular application, but such realization should not be considered to be beyond the scope of the implementations of the present disclosure.

The function units may be stored in a computer-readable storage medium if realized in a form of software functional units and sold or used as a separate product. Based on this understanding, the technical solutions of the implementations of the present disclosure, in essence, or the part contributing to the existing art, or part of the technical solutions, may be embodied in a form of a software product. The computer software product is stored in a storage medium, including a number of instructions for causing a computer device (which may be a personal computer, a server, or a network device, or the like) to perform all or part of the acts of the methods in the implementations of the present disclosure. And the aforementioned storage medium includes various kinds of media that may store program codes, such as a USB flash disk, a removable hard disk, a read-only memory, a random access memory, a magnetic disk or an optical disk, etc.

Those skilled in the art may clearly understand that for convenience and conciseness of description, as to the specific working process of the system, device and unit described above, reference may be made to the corresponding process in the aforementioned method implementations, and details will not be described herein again.

In the several implementations provided in the present disclosure, it should be understood that the disclosed systems, devices and methods may be implemented in another mode.

For example, the division of the units, modules or components in the above-mentioned device implementations is only a logical function division, and there may be another division mode in an actual realization. For example, multiple units, modules or components may be combined or integrated into another system, or some units, modules or components may be ignored or not executed.

In another example, the units/modules/components described above as separate/display components may or may not be physically separated, i.e., they may be located in one place or may be distributed over multiple network units. Part or all of the units/modules/components therein may be selected according to an actual requirement to achieve a purpose of the implementations of the present disclosure.

Finally, it should be noted that the mutual coupling or direct coupling or communication connection shown or discussed in the above may be indirect coupling or communication connection between apparatuses or units through some interfaces, and may be in electrical, mechanical or other forms.

What are described above are merely specific implementation modes of the implementations of the present disclosure, but the protection scope of the implementations of the present disclosure is not limited thereto. Any variation or substitution that may be easily conceived by a person skilled in the art within the technical scope disclosed by the implementations of the present disclosure shall be included within the protection scope of the implementations of the present disclosure. Therefore, the protection scope of the implementations of the present disclosure shall be determined by the protection scope of the claims.

The invention claimed is:

1. A wireless communication method, applied to a terminal device, comprising:

determining, by the terminal device, a transmission mode of information to be transmitted of a sidelink unicast service; and sending, by the terminal device, reporting information of the information to be transmitted to a network device, wherein the information to be transmitted is PC5-S messages;

wherein the PC5-S messages comprise a first PC5-S message and a PC5-S message other than the first PC5-S message;

wherein the reporting information comprises first indication information for indicating the transmission mode of the information to be transmitted, wherein in a case that the information to be transmitted is the PC5-S message other than the first PC5-S message, the first indication information is used for indicating that the transmission mode of the information to be transmitted is unicast; wherein the PC5-S message other than the first PC5-S message comprises: Security Management Configuration (SMC), Security Management Configuration Acknowledgement (SMC-ACK) and Direct Communication Request Acknowledgement (DCR-ACK).

2. The method of claim 1, wherein the reporting information further comprises at least one of:

an address of the information to be transmitted; or quality of service (QoS) information corresponding to the information to be transmitted.

3. The method of claim 2, wherein the transmission mode of the information to be transmitted comprises at least one of: unicast or broadcast, the address of the information to be transmitted comprises at least one of:

a source address, a target address, an application layer address, or a layer 2 address.

4. The method of claim 2, wherein in a case that the information to be transmitted is a PC5-RRC message or a sidelink data radio bearer message, the first indication information is used for indicating that the transmission mode of the information to be transmitted is unicast.

5. The method of claim 1, wherein the method further comprises at least one of:

receiving access layer configuration information of the information to be transmitted sent by the network device;

sending a resource request message of the information to be transmitted to the network device; and receiving sidelink grant information of the information to be transmitted sent by the network device, wherein the sidelink grant information is used for the terminal device to send the information to be transmitted.

6. The method of claim 5, wherein the access layer configuration information comprises configuration information for an access layer entity, wherein the access layer entity comprises at least one of:

a packet data convergence protocol (PDCP) entity, a radio link control (RLC) entity, and a media access control (MAC) entity.

7. A terminal device, comprising: a processor and a transceiver, wherein;

the processor is configured to determine a transmission mode of information to be transmitted of a sidelink unicast service, the transceiver is configured to send reporting information of the information to be transmitted to a network device, wherein the information to be transmitted is PC5-S messages wherein the PC5-S messages comprise a first PC5-S message and a PC5-S message other than the first PC5-S message;

wherein the reporting information comprises first indication information for indicating the transmission mode of the information to be transmitted, wherein in a case that the information to be transmitted is the PC5-S message other than the first PC5-S message, the first indication information is used for indicating that the transmission mode of the information to be transmitted is unicast; wherein the PC5-S message other than the first PC5-S message comprises: Security Management Configuration (SMC), Security Management Configuration Acknowledgement (SMC-ACK) and Direct Communication Request Acknowledgement (DCR-ACK).

8. The terminal device of claim 7, the reporting information further comprises at least one of:

an address of the information to be transmitted; or quality of service (QoS) information corresponding to the information to be transmitted.

9. The terminal device of claim 8, wherein the transmission mode of the information to be transmitted comprises at least one of: unicast or broadcast, the address of the information to be transmitted comprises at least one of:

a source address, a target address, an application layer address, or a layer 2 address.

10. The terminal device of claim 8, wherein in a case that the information to be transmitted is a PC5-RRC message or a sidelink data radio bearer message, the first indication information is used for indicating that the transmission mode of the information to be transmitted is unicast.

11. The terminal device of claim 7, wherein the transceiver is further configured to perform at least one of:

receiving access layer configuration information of the information to be transmitted sent by the network device;

sending a resource request message of the information to be transmitted to the network device; and receiving sidelink grant information of the information to be transmitted sent by the network device, wherein the sidelink grant information is used for the terminal device to send the information to be transmitted.

12. The terminal device of claim 11, wherein the resource request message comprises a buffer status report (BSR).

13. A network device, comprising:

a processor and a transceiver, wherein the transceiver is configured to receive reporting information of information to be transmitted sent by a terminal device based on a transmission mode of the information to be transmitted of a sidelink unicast service, wherein the information to be transmitted is PC5-5 messages;

wherein the PC5-S messages comprise a first PC5-S message and a PC5-S message other than the first PC5-S message;

wherein the reporting information comprises first indication information for indicating the transmission mode of the information to be transmitted, wherein in a case that the information to be transmitted is the PC5-S message other than the first PC5-S message, the first indication information is used for indicating that the transmission mode of the information to be transmitted is unicast;

wherein the PC5-S message other than the first PC5-S message comprises: Security Management Configuration (SMC), Security Management Configuration Acknowledgement (SMC-ACK) and Direct Communication Request Acknowledgement (DCR-ACK).

14. The network device of claim 13, wherein the reporting information further comprises at least one of:

an address of the information to be transmitted; or quality of service (QoS) information corresponding to the information to be transmitted.

15. The network device of claim 14, wherein the transmission mode of the information to be transmitted comprises unicast or broadcast, the address of the information to be transmitted comprises at least one of:

a source address, a target address, an application layer address, or a layer 2 address.

16. The network device of claim 14, wherein in a case that the information to be transmitted is a PC5-RRC message or a sidelink data radio bearer message, the first indication information is used for indicating that the transmission mode of the information to be transmitted is unicast.

17. The network device of claim 13, wherein the transceiver is further configured to perform at least one of:

send access layer configuration information to the terminal device;

receive a resource request message sent by the terminal device based on the access layer configuration information; and send sidelink grant information to the terminal device, wherein the sidelink grant information is used for the terminal device to send the information to be transmitted.

*     *     *     *     *